United States Patent [19]

Sekiguchi

[11] 4,085,419

[45] Apr. 18, 1978

[54] COLOR TELEVISION CAMERA

[75] Inventor: Takeshi Sekiguchi, Tokyo, Japan

[73] Assignee: Canon Kabushiki Kaisha, Tokyo, Japan

[21] Appl. No.: 747,881

[22] Filed: Dec. 6, 1976

[30] Foreign Application Priority Data

Dec. 8, 1975 Japan .................. 50-165526[U]

[51] Int. Cl.² ............................................. H04N 9/09
[52] U.S. Cl. ........................................ 358/55; 358/223
[58] Field of Search ............... 358/41, 50, 55, 223, 358/37

[56] References Cited

U.S. PATENT DOCUMENTS 3,590,145  6/1971  Schneider et al. ............... 358/223 X Primary Examiner—Robert L. Richardson
Attorney, Agent, or Firm—Fitzpatrick, Cella, Harper & Scinto

[57] ABSTRACT

A color television camera, in which bias light is illuminated on each of a plurality of image pick-up tubes through a color separating prism system, and, in which light-emitting means such as tungsten lamp is disposed outside the effective image forming light beam from an objective lens system and adjacent to the end of the entrance area of the color separating prism system.

10 Claims, 6 Drawing Figures

FIG. 1
(PRIOR ART)
FIG. 2
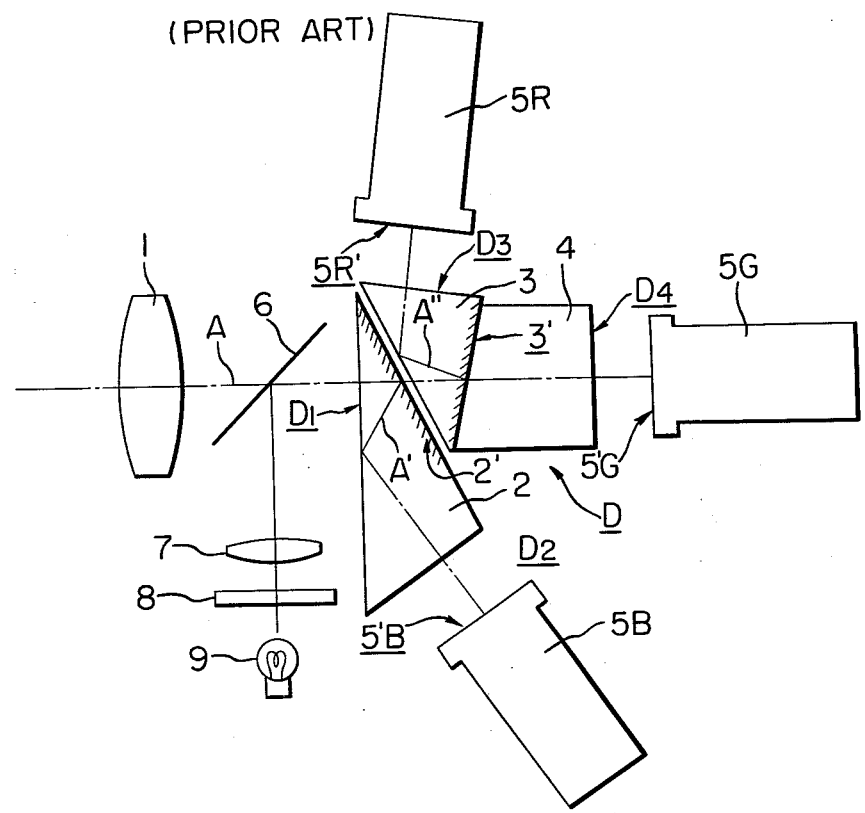
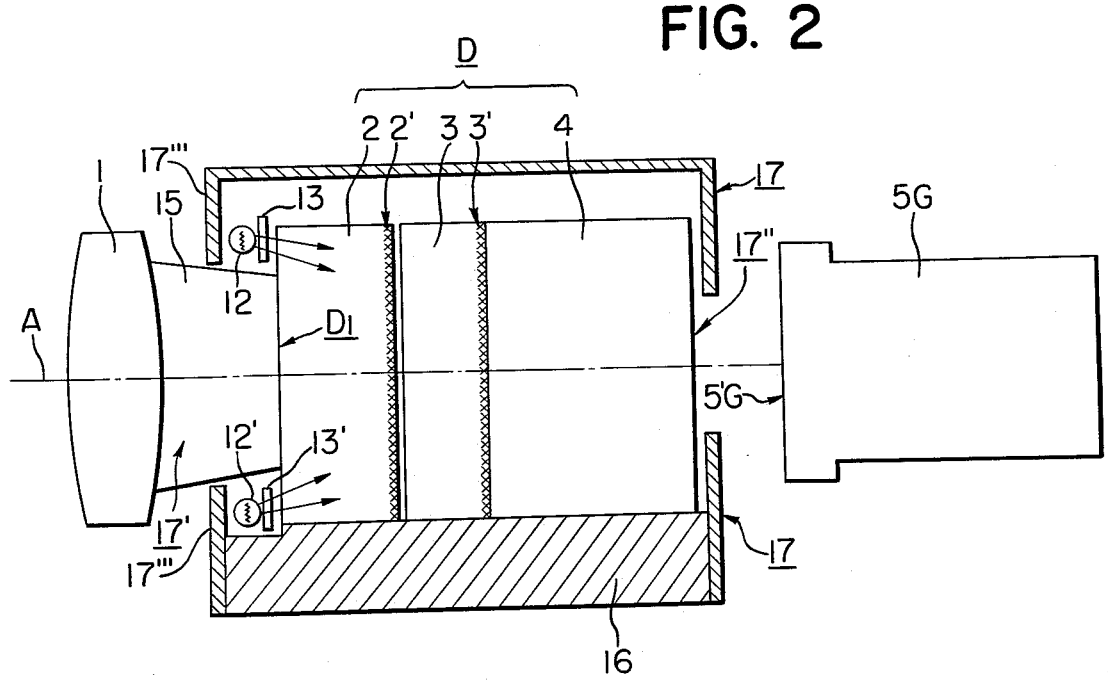

COLOR TELEVISION CAMERA

BACKGROUND OF THE INVENTION

This invention relates to a color television camera provided with a bias light projector.

The light receiving surfaces of image pick-up tubes commonly used with television cameras are formed of photoconductive substances such as PbO, As$_2$Se$_3$, CdSe or the like. When a moving object of a low luminosity is to be photographed by a television camera, especially by a color television camera, using such image pick-up tubes made of the abovementioned photoconductive substances, there occurs such a phenomenon that the outline of the image of the object to be displayed on the image display screen of the television receiver becomes blurred, or the image moves while it is depicting a trail. To eliminate such a disagreeable phenomenon, it has been practised to illuminate the light receiving surfaces of the image pick-up tubes with a uniform auxiliary light of low luminosity. Such auxiliary illuminating light is called the bias light.

SUMMARY OF THE INVENTION

It is an object of the present invention to provide a color television camera provided with a bias light projector of a simple construction.

It is another object of the present invention to provide a color television camera provided with a bias light projector which is only sufficiently small in size so that a space required for installing the same can be correspondingly small.

It is still another object of the present invention to provide a color television camera provided with a bias light projector which does not cause reduction in quantity of the effective image forming light beam.

It is yet another object of the present invention to provide a color television camera provided with a bias light projector which can be at a low manufacturely cost.

The invention will become more fully apparent from the following detailed description thereof taken in conjunction with the accompanying drawings.

BRIEF DESCRIPTION OF THE DRAWINGS

FIG. 1 is a schematic diagram illustrating a layout of a color television camera according to the prior art;

FIG. 2 is a longitudinal cross-sectional view of a main part of the television camera device according to one embodiment of the present invention;

DESCRIPTION OF THE PREFERRED EMBODIMENTS

Figure 3:
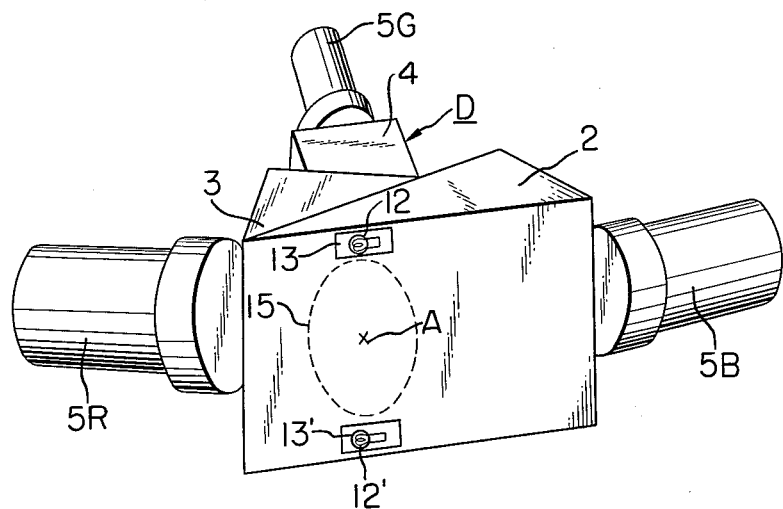
FIG. 3 is a perspective view of the embodiment shown in FIG. 2.

FIG. 1 of the accompanying drawings schematically shows an example of the prior art television camera provided with a bias light projector. Designated by 1 is an objective lens for converting the light from an object to be photographed (not shown) into an image forming light beam. D is a color separating prism system having three exit surfaces D2, D3 and D4. The entrance surface D1 of the prism system D is opposed to the objective lens 1. Opposed to the exit surfaces D2, D3 and D4 are light receiving surfaces $5'_B$, $5'_G$ and $5'_R$ of the image pick-up tubes $5_B$, $5_G$ and $5_R$, respectively. The color separating prism system comprises three prism elements 2, 3 and 4.

The prism elements 2 and 3 are respectively provided with dichroic films 2' and 3' for color separation. The dichoric film 2' is one which reflects, for example, the light in the blue color range and transmits the other color lights, and the dichroic film 3' is one which reflects, for example, the light in the red color range and transmits the other color lights.

The image-forming light beam projected from the objective lens 1 is separated into lights in the three wavelength ranges, i.e. blue, green and red, by the color separating prism system D comprising the prism elements 2, 3, 4 and dichroic films 2', 3'. The thus separated lights are projected onto their corresponding photoconductive surfaces $5'_B$, $5'_G$ and $5'_R$ of the image pick-up tubes $5_B$, $5_G$ and $5_R$ through respective exit surface D2, D3 and D4. As is well-known, each image pick-up tube electronically scans a light receiving surface to generate an electrical signal corresponding to the optical image formed thereon.

In the apparatus of FIG. 1, there is provided, between the objective lens 1 and the prism system D, bias light illuminating means comprising a half-mirror 6 disposed obliquely with respect to the optical axis, a lamp 9, a diffusing plate 8, and a projection lens 7. The lamp 9 illuminates the diffusing plate 8, from which the light may pass through the lens 7, the half-mirror 6 and the color separating prism system D to be prjected onto the light receiving surfaces $5'_B$, $5'_G$ and $5'_R$ of the image pick-up tubes.

In the apparatus of FIG. 1, however, as the half-mirror 6 is obliquely disposed between the objective lens 1 and the color separating prism system D for bias illumination, not only the construction of the apparatus as a whole become complicated, but also a considerable space is required therebetween. On account of this, there occur inconveniences such that not only reduction in size of the camera is hindered, but also use of an objective lens having a short back-focal length becomes difficult. Further, as a part of the effective image forming light beam is reflected by the half-mirror 6, there would also be such inconvenience that the effective F-number of the objective lens is reduced to cause decrease in the sensitivity of the camera.

Throughout FIGS. 2 to 6, those members which are functionally identical to those in FIG. 1 are given reference characters identical to those used in FIG. 1. Also, in FIGS. 2, 4, 5 and 6, the color separating prism system D is shown in a cross-section taken on a plane containing the optical axis A of the objective lens 1 and being perpendicular to a plane containing the optical axis a of the objective lens 1 and the reflection optical axis A', A" of the color separating prism system D, namely, a plane perpendicular to the plane of the drawing sheet of FIG. 1. (In the present specification, the color separating prism system means a prism system having a color separating surface like a dichroic surface which usually reflects light in a particular wavelength range within an incident light beam and transmits the light in the other wavelength ranges, thereby separating the incident light beam into beams of light in a plurality of predetermined wavelength ranges. Further, the reflection optical axis of the color separating prism system means the route, along which the light ray propagated on the optical axis of the objective lens is further propagated after being reflected by the aforementioned color separating surface.)

Referring now to FIG. 2, the color separating prism system D identical to that shown in FIG. 1 is disposed in the light path between the objective lens system 1 and the image pick-up tubes $5_B$, $5_G$ and $5_R$. This prism system D is fixed on a bed 16 and surrounded by a casing member 17. That portion of the casing member 17 which is opposed to the objective lens 1 and that portion of the casing member 17 which is opposed to the image pick-up tubes $5_B$, $5_G$ and $5_R$ are formed with openings 17' and 17", respectively. These openings 17' and 17" are so shaped and dimensioned as to permit passage therethrough of the effective part of the light beam or the effective image forming light beam from the objective lens 1. As shown, a slight clearance is usually provided between the inner wall of the casing member 17 and the prism system D. (The effective part of the light beam or the effective image forming light beam from the objective lens 1 used herein means the light beam impinging on the effective area of the light receiving surface of each image pick-up tube scanned to generate signals for the image appearing on the image display screen of the television receiver.)

Designated by 12 and 12' are tungsten lamps which emit light upon receipt of supply of an electrical input thereto. The lamps 12 and 12' are disposed in a gap between the front wall 17'" of the casing member 17 and the entrance surface D1 of the prism system D. That is, the lamps 12 and 12' are disposed at a position outside the effective image forming light beam from the objective lens 1 and immediately before both ends of the entrance surface D1 of the prism system D so as to be opposed to both ends of the entrance surface D1. Further, the lamps 12 and 12' are disposed on a plane containing the optical axis of the objective lens 1 and being perpendicular to a plane containing the optical axis of the objective lens 1 and the reflection optical axis of the prism system D. This is intended to eliminate irregularity in the luminance distribution of the bias light on the light receiving surface of each image pick-up tube, which irregularity results from the fact that any difference in angle of incidence of light upon the dichroic surface causes a difference in the spectral reflection (and transmission) factor of that surface. Also, the use of two lamps is to eliminate the irregularity in the luminance distribution of the bias light by illuminating the light receiving surface of each image pick-up tube from symmetrical directions.

The light emitted from the lamps 12 and 12' directly travels to the ends of the entrance surface D1 of the prism system D and passes through these ends into the prism system D, where the light is color-separated by the dichroic surfaces 2' and 3', thereafter the separated lights are projected onto the light receiving surfaces $5'_B$, $5'_G$ and $5'_R$.

If required, filters 13 and 13' may be disposed between the lamps 12, 12' and the ends of the entrance surface D1 of the prism system D. Alternatively, the filters 13 and 13' may be attached to the ends of the entrance surface of the prism system D. These filters 13 and 13' may be such ones that correct the spectral distribution of the light emitted from the lamps 12 and 12'. In such a case, the filters 13 and 13' to be used may be those color filters or the like which correct a predetermined light quantity in the spectral component of the light emitted from the lamps 12 and 12'. That is, for example, where the color temperature of the lamps 12 and 12' is high, the quantity of the bias light projected into the image pick-up tube $5_R$ is great, in which case there may be used a filter that absorbs the spectral light component projected into the tube $5_R$ at a required ratio. The filters 13 and 13' may be ND (neutral density) filters which correct the quantity of light from the lamps 12 and 12' irrespective of the spectral distribution. In this latter case, adjustment of the spectral distribution is effected by adjustment of the input to the lamps 12 and 12'. The ND filters are used when brightness of the lamps 12 and 12' becomes too high on account of this emitting light having an appropriate spectral distribution.

In order that more uniform luminace distribution of the bias light may be provided on the light receiving surface of each image pick-up tube, it is desirable that the light entering from the lamps 12, 12' into the prism system D be a diffused light. For this purpose, the tube surfaces of the lamps 12, 12' are rendered diffusing surfaces, and/or those portions of the entrance surface D1 of the prism system D which are opposed to the lamps 12, 12' and lie outside the effective light beam 15 are rendered coarse surfaces, and/or transmission type diffusing plates are disposed in a gap between the lamps 12, 12' and the ends of the entrance surface D1 of the prism system D. In the last-mentioned case, the filters 13 and 13' may be used also as the diffusing plates. That is, one or both of the surfaces of each filter 13, 13' for correcting the quantity of and the total component light or partial component light may be formed as coarse surfaces.

Figure 4:
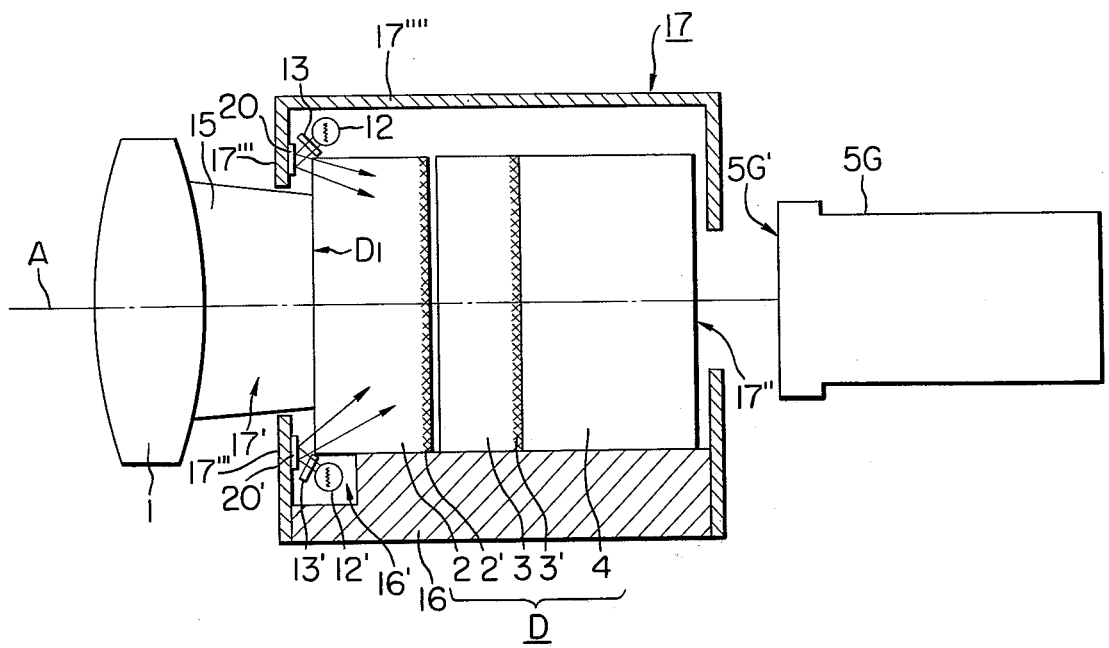
FIG. 4 is a longitudinal cross-sectional view of a main part of the television camera device according to another embodiment of the present invention.
Figure 5:
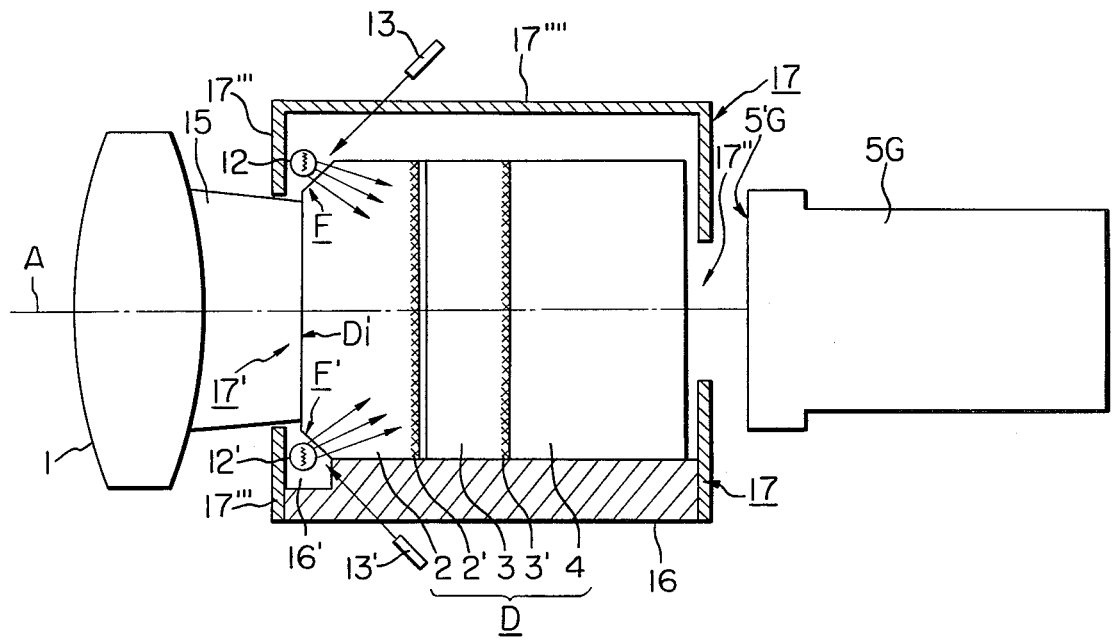
FIG. 5 is a longitudinal cross-sectional view of a main part of the television camera device according to still another embodiment of the present invention.
Figure 6:
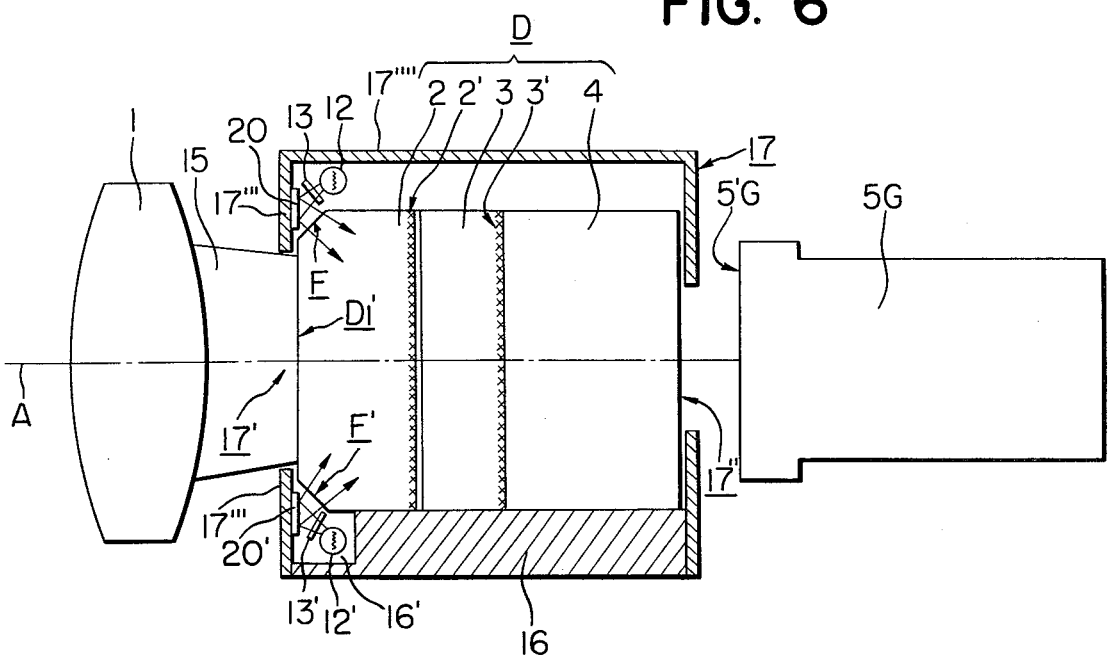
FIG. 6 is a longitudinal cross-sectional view of a main part of the television camera device according to other embodiment of the present invention.

FIGS. 4, 5 and 6 show embodiments which are suited for a case where the gap between the prism system D and the front wall 17'" of the casing member 17 is narrower.

In FIG. 4, the lamps 12 and 12' are disposed at a position outside the effective image forming light beam 15 and to the lateral side of, but closely adjacent to, the entrance surface D1 of the prism system D. In other words, the lamp 12 is disposed in the gap between the front upper side surface of the prism system D and the upper wall 17"" of the casing member 17, while the lamp 12' is disposed in the gap between a recess 16' formed in the front part of the prism bed 16 and the front lower side surface of the prism system D. In order that the light emitted from the lamps 12, 12' may enter the prism system D, mirrors 20 and 20' are adhesively attached to the front wall 17'" of the casing member 17 at a position immediately before the ends of the entrance surface of the prism system D. It goes without saying that the mirrors 20 and 20' are disposed outside the effective image forming light beam 15 so as to be opposed to the lamps 12 and 12' and to the ends of the entrance surface D1 of the prism system.

In the same manner as already described, the lamps 12 and 12' and, accordingly, the mirrors 20 and 20' lie in a plane containing the optical axis of the objective lens 1 and perpendicular to another plane containing the optical axis of the objective lens 1 and the reflection optical axis of the prism system D.

As already noted, also, the filters 13 and 13' for adjusting the quantity of the total or partial component of the light emitted from the lamps 12, 12' may, if required, be disposed in the light path between the lamps 12, 12' and the ends of the entrance surface D1 of the prism system D. Further, as already described, diffusing surfaces are disposed in the aforementioned light path. More specifically, the tube surfaces of the lamps 12, 12' are rendered the diffusing surfaces, and/or those portions of the entrance surface D1 of the prism system D which are optically opposed to the lamps 12, 12' and lie outside the effective light beam 15 are rendered the coarse surfaces, and/or the filters 13, 13' are provided with the diffusing surfaces, and/or the reflecting surfaces of the mirrors 20, 20' are rendered the diffusing surfaces.

In the above-described construction, the light emitted from the lamps 12, 12' are reflected by the mirrors 20, 20', thereafter the light enters into the prism system D for color separation, and then the respective color lights are projected onto the light receiving surfaces $5'_B$, $5'_G$ and $5'_R$ of the image pick-up tubes.

In FIG. 5, the prism system D has chamfers F, F' adjacent to the entrance surface D1', for the image forming light beam where the effective image forming light beam 15 from the objective lens 1 enters into the prism system. These chamfers F, F' are inclined with respect to the surface D1' and, of course, lie outside the effective image forming light beam 15.

Lamps 12, 12' are disposed in the gap between the chamfers F, F' and the front wall 17''' of the casing member 17. More specifically, the lamps 12, 12' are disposed at a position outside the effective image forming light beam 15 and to the lateral side of the surface D1', but immediately before the chamfers F, F'. Thus, the lamps 12, 12' are situated in a plane containing the optical axis of the objective lens 1 and being perpendicular to another plane containing the optical axis of the objective lens 1 and the reflecting optical axis of the prism system D.

In the same manner as already described, filters 13 and 13' for correcting the quantity of the total or partial component of the light may be disposed in the gap between the lamps 12, 12' and the chamfers F, F'. Also, in the same manner as already described, diffusion transmission surfaces are disposed in the light path between the lamps 12, 12' and the chamfers F, F'. More specifically, the tube surfaces of the lamps 12, 12' are rendered the diffusing surfaces, and/or the chamfers, F, F' are rendered the coarse surfaces, and/or the filters 13, 13' are arranged to function as the diffusing plates.

In the above-described construction, the light emitted from the lamps 12, 12' directly travels to the chamfers, F, F' and passes therethrough into the prism system D for color separation, thereafter the respective color lights are projected onto the light receiving surfaces $5'_B$, $5'_G$ and $5'_R$ of the image pick-up tubes.

Referring to FIG. 6, the prism system D has chamfers F, F' outside the entrance surface D1' for the effective image forming light beam, as in FIG. 5. The lamp 12 is disposed in the gap between the front end of the prism system D and the upper wall 17'' of the casing member 17, and the lamp 12' is disposed in the gap between the prism system D and the recess 16' in the front end portion of the bed 16. In other words, each of the lamps 12, 12' is disposed at a position to the lateral side of the prism system D and closely adjacent to the chamfers F, F'. In order that the light emitted from these lamps 12, 12' may be projected onto the chamfers F, F', mirrors 20 and 20' are adhesively attached to the front wall 17''' of the casing member 17 immediately before the chamfers F, F' so as to be opposed to the lamps 12, 12'. Needless to say, the lamps 12, 12' and the mirrors 20, 20' lie outside the effective image forming light beam.

The lamps 12, 12' and, accordingly, the mirrors 20, 20' and the chamfers F, F' lie in a plane containing the optical axis of the objective lens 1 and perpendicular to another plane containing the optical axis of the objective lens 1 and the reflection optical axis of the prism system D. In the same manner as already described, filters 13, 13' for adjusting the quantity of the total or partial component of the light may, if necessary be disposed in the light path between the lamps 12, 12' and the chamfers F, F'. Also, in the same manner as already described, diffusing surfaces are disposed in the light path. More specifically, the tube surfaces of the lamps 12, 12' are rendered the diffusing surfaces, and/or the filters 13, 13' are provided with the diffusing surfaces, and/or the chamfers F, F' are rendered the coarse surfaces, and/or the reflecting surfaces of the diffusion mirrors 20, 20' are formed as diffusion-reflection surfaces.

With the above-described construction, the lights emitted from the lamps 12, 12' are reflected by the mirrors 20, 20' and then travel to the chamfers, F, F', thereafter the lights enter into the prism system D for color separation, and the respective color lights are projected onto the light receiving surfaces $5'_B$, $5'_G$ and $5'_R$ of the image pick-up tubes.

In the foregoing, the lamps 12, 12' have been described as tungsten lamps, although this is not restrictive but use may be made of any other small-sized light-emitting means such as, for example, light emitting diodes which will convert electrical energy or like into light upon receipt of supply of such energy thereto. In the latter case, three different diodes emitting a blue, a green and a red color light, respectively, may be used in combination.

(It should be understood that the term "front" or "before" as used herein means a direction from the image pick-up tubes to the objective lens and the term "lateral" is meant by a direction away from the optical axis.)

What is claimed is:

1. A color television camera comprising:
    an objective lens system;
    a color separating prism system having an entrance surface for an image forming light beam, chamfered portions contiguous to said entrance surface, and a plurality of exit surfaces, said prism system being so disposed that said entrance surface may be optically opposed to said objective lens system;
    a plurality of image pick-up tubes, each of which is disposed in an optically opposed relationship to each of said plurality of exit surfaces of said objective lens system; and
    means to emit light, said light emitting means being disposed at a position outside the effective portion of the light beam from said objective lens system so as to be optically opposed to said chamfered portions of said color separating prism system, the light emitted from said light emitting means being projected into said color separating prism system from said chamfered portions, after which it is projected into each of said image pick-up tubes.

2. A color television camera according to claim 1, wherein said chamfered portions of said color separating prism system and said light-emitting means lie in a plane containing the optical axis of said objective lens system and being perpendicular to another plane containing said optical axis of said objective lens system and the reflection optical axis of said color separating prism system.

3. A color television camera according to claim 1, wherein said light-emitting means is disposed at a position to the front side of said chamfered portions of said color separating prism system.

4. A color television camera according to claim 1, wherein a reflecting surface is disposed at a position to the front side of said chamfered portions of said color separating prism system in an opposed relationship with said chamfered portions, and said light-emitting means is disposed at a position to the lateral side of said color separating prism system in an opposed relationship with said reflecting surface.

5. A color television camera according to claim 1, wherein filters for correcting the amount of light are disposed in the light path between said light-emitting means and the chamfered portions of said color separating prism system.

6. A color television camera according to claim 1, wherein diffusing surfaces are disposed in the light path between said light-emitting means and the chamfered portions of said color separating prism system.

7. A color television camera according to claim 6, wherein said diffusing surfaces are provided on said chamfered portions of said color separating prism system.

8. A color television camera according to claim 1, wherein said chamfered portions of said color separating prism system are inclined with respect to said entrance surface for image forming light beam.

9. A color television camera according to claim 1, wherein said light-emitting means comprise tungsten lamps.

10. A color television camera according to claim 1, wherein two chamfered portions are provided contiguous to said entrance surface and said means to emit light comprise first and second light emitting means disposed outside the effective portion of the light beam from said objective lens system so as to be optically opposed to said two chamfered portions of said color separating prism system, respectively.

* * * * *